June 10, 1930.    W. E. PARKER    1,763,565
HYDRAULIC TRANSMISSION MECHANISM
Filed Dec. 21, 1925    4 Sheets-Sheet 1
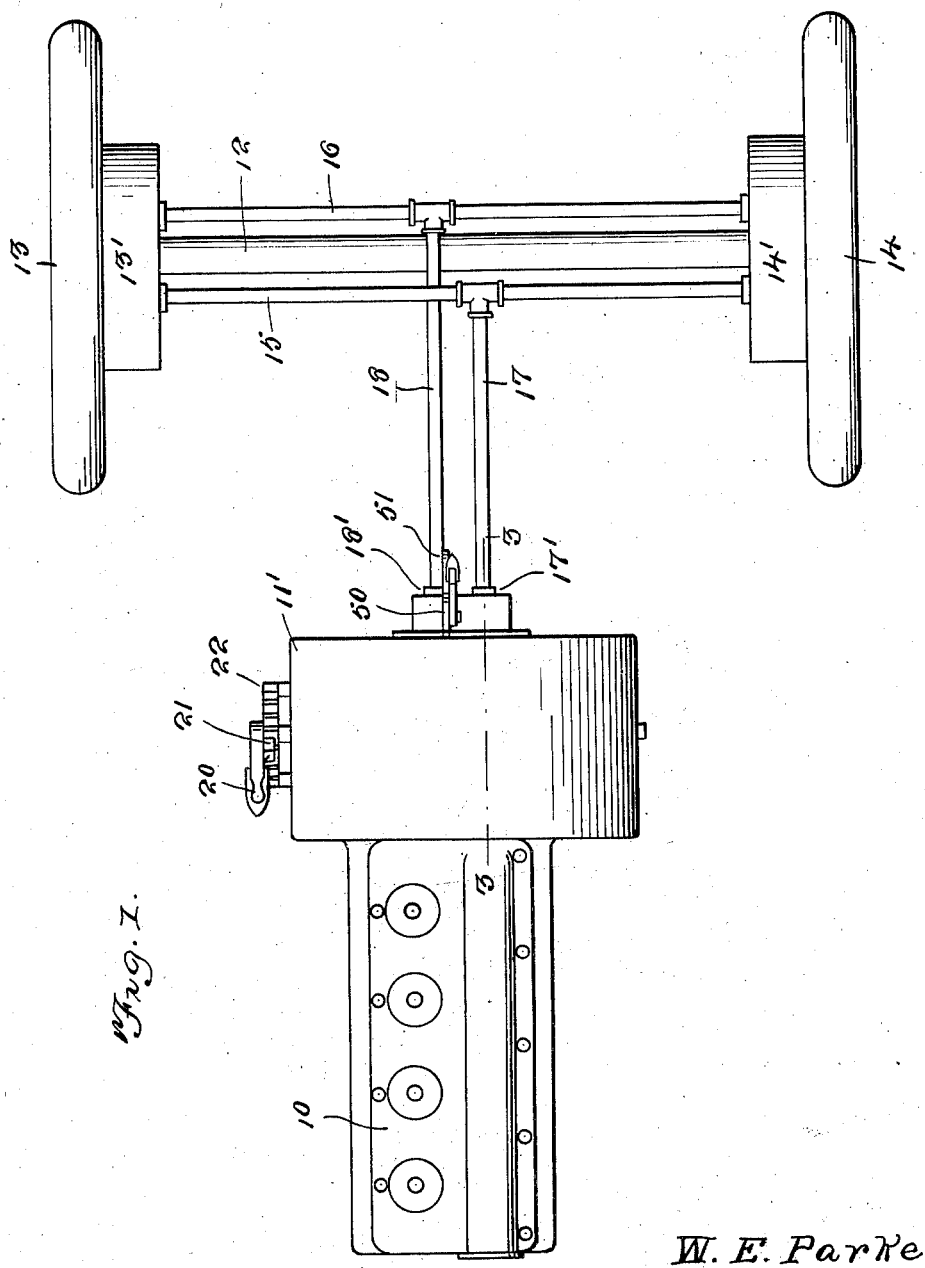
Fig. I.
W. E. Parker
INVENTOR
BY Victor J. Evans
ATTORNEY
WITNESS:

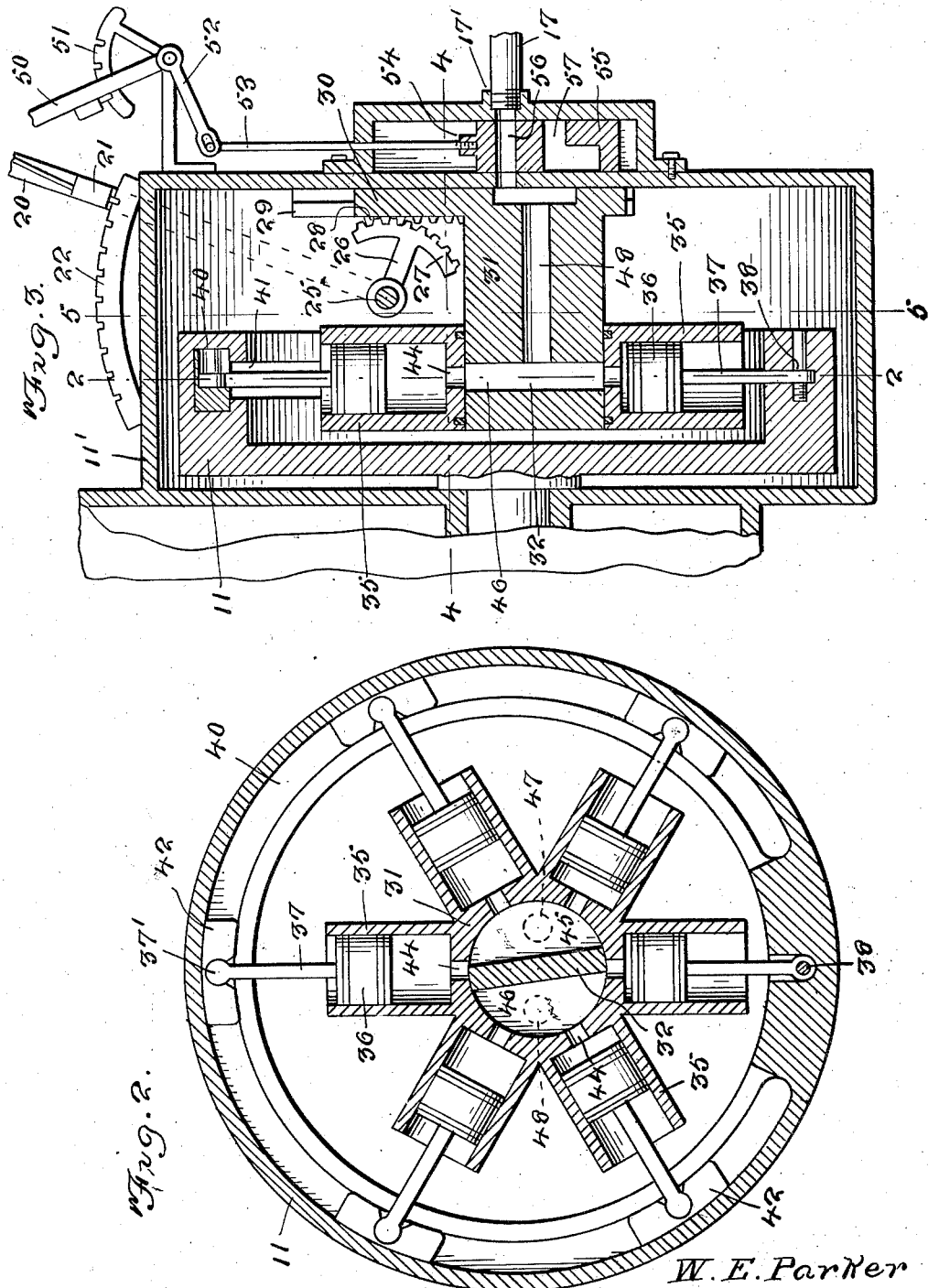

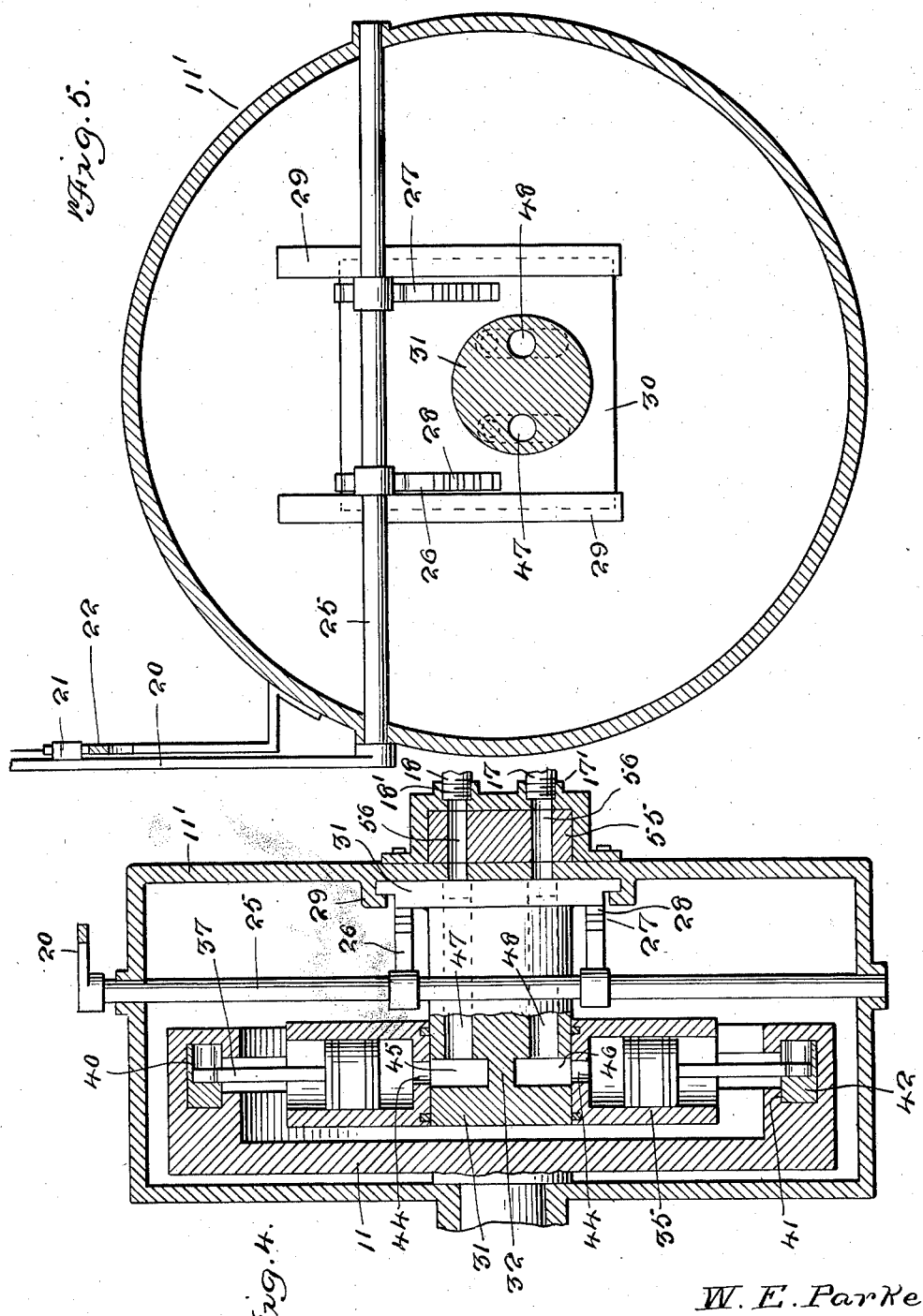

June 10, 1930.  W. E. PARKER  1,763,565
HYDRAULIC TRANSMISSION MECHANISM
Filed Dec. 21, 1925  4 Sheets-Sheet 4
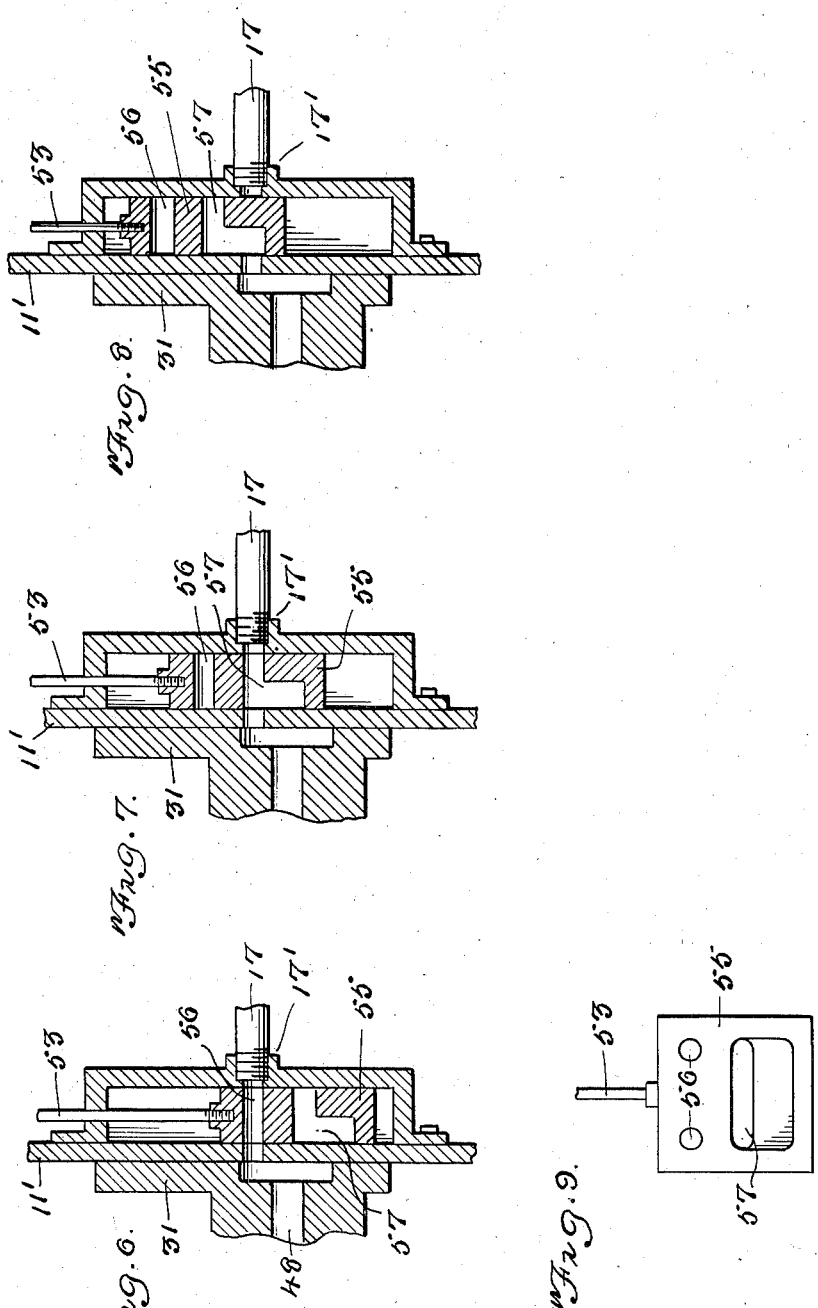

Patented June 10, 1930

1,763,565

UNITED STATES PATENT OFFICE

WILLIAM E. PARKER, OF PHILADELPHIA, PENNSYLVANIA

HYDRAULIC TRANSMISSION MECHANISM

Application filed December 21, 1925. Serial No. 76,937.

The object of this invention is to provide a hydraulic transmission system for motor cars and the like, by the use of which a clutch of the type usually employed is rendered unnecessary, and the gear shifting device and differential may be eliminated.

A further object is to provide pumping mechanism directly associated with the fly wheel of the engine.

A further object is to provide a fly wheel having a chamber therein, within which pistons are mounted, these pistons and their cylinders radiating from a common point, and the piston being controlled by the degree of eccentricity of a device within the fly wheel housing and mounted in the manner indicated below.

A further object is to provide special controlling means in the transmission pipe line.

With the foregoing and other objects in view, the invention consists in the novel combination and arrangement of elements described, illustrated and claimed, it being understood that changes may be made within the scope of the claim without departing from the spirit of the invention.

In the drawing forming part of this application:—

Figure 1 is a plan view showing an engine conventionally, and showing a rear axle and rear wheels of a motor car.

Figure 2 is a section on the line 2—2 of Figure 3.

Figure 3 is a section on the line 3—3 of Figure 1.

Figure 4 is a section on the line 4—4 of Figure 3.

Figure 5 is a section on line 5—5 of Figure 3.

Figures 6, 7 and 8, show different positions of a controlling element to be connected with the pipe line between the pumping apparatus and the motor for the wheels.

Figure 9 is a side view of the controlling valve per se, forming part of the controlling device.

In Figure 1, the reference character 10 indicates an engine, which is shown conventionally, and a fly wheel is designated 11, this fly wheel having the construction shown in section in Figure 4 and elsewhere and being mounted in housing 11'. A rear axle designated 12 mounts wheels 13 and 14, and the casings of motors for the individual wheels 13 and 14 are shown at 13' and 14'. Extending between the housings or casings 13' and 14' are pipes 15 and 16, and the former has communication with the pipe 17 connected with the housing of the fly wheel, at the point 17', as illustrated in Figure 4. The pipe 16 is in communication with the pipe 18 which has connection with the housing of the fly wheel at the point 18'.

Figure 1 further shows means for controlling the degree of eccentricity of an element of the pumping apparatus. In this construction, a lever 20 is provided with an engaging element 21 for cooperation with a segment 22, the lever being rigid with a shaft 25, illustrated in Figure 5.

Shaft 25 carries arms 26, and carried by these arms are racks 27 cooperating with racks 28 on slidable element 30 mounting axial member 31, the latter being divided into longitudinal portions by wall 32. Guides 29 are provided for slidable element 30, and upon the operation of lever 20 and element 30, the axial member 31 may be shifted to an eccentric position with reference to fly wheel 11, and may be shifted from one side of the center to the other side, in an obvious manner, when reversing the direction of drive.

The fly wheel 11 includes an outer flange provided with a groove 40 having a reduced entrance portion 41, and within the groove the socket members 42 are movable, these socket members receiving the rounded ends 37' of piston rods 37. The cylinders 35 have communication with ports 44 leading through passages 45 and 46 to channels 47 and 48 in element 31, the channels being in communication with pipes 17 and 18 of Figures 1 and 4. At a given time, the pistons 36 have the relative position shown in Figure 2, in view of the eccentric position of element 31, and oil or other fluid is pumped to the motors of the individual wheels 13 and 14, and is returned from said motors to the pumping apparatus, completing a circuit.

A controlling valve 55 is operated by a lever 50, the engaging elements of which cooperate with segment 51, the lever moving an arm 52 and a rod 53 connected at 54 with the valve 55. This valve is provided with passages 56 and 57, the latter being of angular form, and the varied positions assumed by the valve in the operation of the device are show in Figures 6, 7, and 8, the valve per se being shown in elevation in Figure 9.

Figure 6 shows the relative position of the elements when transmitting fluid for power purposes, and in Figure 7 the position necessary for by-passing the pump and motors, is illustrated. Figure 8 shows the flow of oil cut off, for braking purposes.

What is claimed is:

In a device of the class described, a housing one wall of which is provided with ports, guides carried by the inner surface of the wall, a body slidable in the guides and having ports for the distribution of fluid through the ports first named, a plurality of pipes for conducting fluid in opposite directions, a valve casing carried by said wall and in communication with the pipes, and a slide valve operable separately from the body and within the valve casing, this valve having a port for placing the pipes in communication simultaneously with the ports of the body, the valve having other ports for placing the pipes in communication individually with the ports of the body.

In testimony whereof I affix my signature.

WILLIAM E. PARKER.